United States Patent [19]

Konoki et al.

[11] Patent Number: 4,510,988

[45] Date of Patent: Apr. 16, 1985

[54] TUBE FOR THERMAL CRACKING OR REFORMING HYDROCARBON AND MANUFACTURING METHOD THEREOF

[75] Inventors: Keizo Konoki, Takaidohigashi; Takanobu Shinohara; Ikuyoshi Kochi, both of Chiba; Keiichi Shibata, Mobara; Hisakatsu Nishihara, Hirakata; Toshiaki Morichika, Hirakata; Junichi Sugitani, Hirakata; Koji Tsuchida, Hirakata, all of Japan

[73] Assignees: Kubota Ltd., Osaka; Toyo Engineering Corporation, Tokyo, both of Japan

[21] Appl. No.: 408,820

[22] Filed: Aug. 17, 1982

[30] Foreign Application Priority Data

Aug. 21, 1981 [JP] Japan .................. 56-131899
Aug. 21, 1981 [JP] Japan .................. 56-131900
Aug. 21, 1981 [JP] Japan .................. 56-131901

[51] Int. Cl.³ .............................................. B22D 19/08
[52] U.S. Cl. ..................................... 164/102; 427/191
[58] Field of Search ................. 164/95, 96, 99–105; 208/48 R; 228/224; 427/191, 192; 148/24

[56] References Cited

U.S. PATENT DOCUMENTS

| | | | |
|---|---|---|---|
| 3,248,441 | 4/1966 | Soderquist | 208/48 R |
| 3,262,983 | 7/1966 | Ladd et al. | 208/48 R |
| 3,536,776 | 10/1970 | Lo | 260/683 |
| 3,827,967 | 8/1974 | Nap et al. | 208/48 |

FOREIGN PATENT DOCUMENTS

| | | | |
|---|---|---|---|
| 52-73127 | 6/1977 | Japan | 164/95 |
| 53-26724 | 3/1978 | Japan | 164/114 |
| 55-86670 | 6/1980 | Japan | 164/95 |
| 55-158874 | 12/1980 | Japan | 164/95 |
| 1552284 | 9/1979 | United Kingdom | |
| 406625 | 4/1974 | U.S.S.R. | 164/95 |

Primary Examiner—Kuang Y. Lin
Attorney, Agent, or Firm—Armstrong, Nikaido, Marmelstein & Kubovcik

[57] ABSTRACT

A reactor tube for thermally cracking or reforming hydrocarbons comprising a tube member made of Fe-Cr-Ni heat resisting material and a covering layer of self-fluxing alloy fusing to the inner surface of the tube member, the covering layer made of heat resisting material free from Ni or with a low Ni content. The tube member is manufactured by centrifugal casting, and the covering layer is formed by applying the self-fluxing alloy powder by scattering with or without thermit agent or spraying the alloy to the inner surface of the tube member.

17 Claims, 1 Drawing Figure

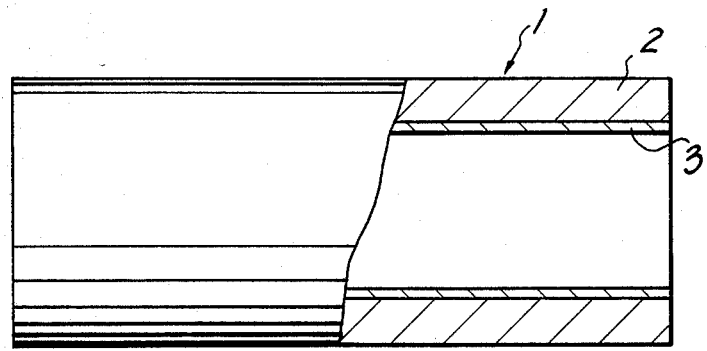

TUBE FOR THERMAL CRACKING OR REFORMING HYDROCARBON AND MANUFACTURING METHOD THEREOF

BACKGROUND OF THE INVENTION

The present invention relates to an improvement in a reactor tube for thermally cracking or reforming hydrocarbons and a method to manufacture it.

When a liquid or gaseous hydrocarbon is subjected to the chemical reaction of thermal cracking or reforming at high temperature and high pressure in the presence or absence of a catalyst, solid carbon deposits, and the carbon deposit builds up in the lamellar form in the reaction zone on an inner surface of a tube serving as the reactor.

When a hydrocarbon is passed through the tube for the chemical reaction, the deposit of solid carbon on the inner surface of the tube, if allowed to build up, impedes the flow of a fluid containing the hydrocarbon. The carbon deposit also results in a seriously reduced heat transfer efficiency when reaction heat is supplied to or removed from the tube from outside to carry out the cracking or reforming chemical reaction. Consequently it becomes difficult to continue the operation of the reactor.

The material heretofore used for such reactors is Fe-Cr-Ni austenitic heat resisting steel which contains large amounts of Ni and Cr for use at high-temperature, high-pressure operating conditions and which is generally used for fabricating high-temperature equipment. It is usual practice to increase the Ni content of the heat resisting steel material for tubes which are used at higher operating temperatures.

However, when a tube is used which is produced from the Fe-Cr-Ni austenitic heat resisting steel, solid carbon inevitably deposits on the inner surface of the tube, giving rise to the necessity for shutdowns to decoke the reactor by various methods although the reactor is to be operated continuously as a rule.

The deposition of solid carbon occurs more markedly if the steel material has a higher Ni content. In this case, solid carbon deposits on the tube inner surface in a short period of time, and the carbon deposit builds up rapidly, consequently entailing the problem that the reactor must be decoked more frequently.

We have carried out intensive research on the deposition of solid carbon on the tube inner surface and found that there is a correlation between the amount of the solid carbon deposit and the Ni content of the Fe-Cr-Ni austenitic heat resisting steel material which forms the reactor tube and further that the Ni in the steel material, especially the Ni portion present on the inner surface of the tube, acts catalytically to promote the deposition of solid carbon from hydrocarbons.

SUMMARY OF THE INVENTION

According to the present invention, the deposition of solid carbon on a reactor tube is prevented to the greatest possible extent while the tube is in use for thermally cracking or reforming hydrocarbons. For this purpose, the surface of the tube to be brought into contact with a fluid containing hydrocarbon is covered with a layer of heat resisting material free from Ni or with a low Ni content to hold the Ni contained in the reactor tube out of contact with the hydrocarbon, whereby the foregoing problems are basically overcome.

More specifically, the present invention provides a reactor tube for thermally cracking or reforming hydrocarbons wherein the reactor tube comprises a tube member of Fe-Cr-Ni austenitic heat resisting steel and a covering layer of self-fluxing alloy deposited over and combined with the inner surface of the tube member.

Another object of the invention is to provide a method of manufacturing the reactor tube using the process of manufacturing the tube member, that is centrifugal casting, to the best advantage by scattering or spraying powder of the self-fluxing alloy during such stage when the tube body has solidified but high temperature in the tube body is retained or by adding thermit agent simultaneously with or after scattering or the self-fluxing alloy.

DESCRIPTION OF THE DRAWING

FIGURE is a sectional view of a reactor tube of the present invention.

DETAILED DESCRIPTION OF THE INVENTION

A reactor tube 1 of the present invention comprises a tube member 2 and a covering layer 3 of self-fluxing alloy provided over and combined with the inner surface of tube member.

The tube member 2 is made of Fe-Cr-Ni austenitic heat resisting steel which is normally used for tubes of the type described. The blank tube for the tube member 2 is one produced by centrifugal casting. On the other hand, the covering layer 3 of the self-fluxing alloy, which is the inner component of the reactor tube 1, is made of self-fluxing alloy free from Ni or with a low Ni content, the self-fluxing alloy being fused to the inner surface of the tube member 2 to form the covering layer.

The reactor tube 1 is manufactured with the following method.

At the first stage the tube member is manufactured by centrifugal casting from molten heat resisting steel (including heat resisting cast steel).

Covering layer is produced by scattering powder of self-fluxing alloy evenly over the inner surface of the cast tube member during such stage when the inner surface of the tube member has solidified but high temperature in the tube member is retained, i.e. red heating state. The powder of the self-fluxing alloy is fused by the high temperature retained in the cast tube member and caused to form a covering layer on to the inner surface of the tube member combined integrally therewith.

A gutter-like long open vessel is used as an apparatus to scatter the powder of self-fluxing alloy over the inner surface of the tube member. The long vessel filled with powder of self-fluxing alloy is inserted from one of the opening of the mold for centrifugal casting through band in the mold to the entire length of cast tube member, and the vessel is upset in the mold. Since the mold is rotating with high speed for example in 1000 to 1500 rpm when the vessel is upset, the powder of the self-fluxing alloy is scattered evenly over inner surface of the tube member.

Apparatus for scattering is not restricted to the gutter-like long open vessel. Any kind of apparatus or device which fits to the object of the present invention shall be used to scatter the powder of self-fluxing alloy in the tube member.

The cast tube member is about 2,000–5,000 mm in length, about 50–200 mm in inner diameter and about 8–25 mm in wall thickness.

Molten heat resisting alloy for tube member solifies at the temperature of 1370°–1400° C. whereas melting point of self-fluxing alloy is 1000°–1100° C. which is far below the solidifying temperature of the tube member, the powder of self-fluxing alloy is caused to melt by the heat retained in the cast tube member.

The quantity of the powder of self-fluxing alloy which is scattered on the inner surface of the tube member is approximately 0.1–1 gram/cm$^2$ to the unit area of inner surface of tube member.

The scattering of the powder of self-fluxing alloy is performed preferably immediately after the solidification of the inner surface of the tube member. If the self-fluxing alloy is scattered too early when the inner surface of the tube member is non-solidified state, the self-fluxing alloy is mixed with the tube member made of heat resisting alloy containing high proportion of Ni, resulting in a failure of forming desired covering layer free from Ni or with a low Ni content.

There is another disadvantage if self-fluxing alloy is scattered too early when the inner surface of the tube member is still non-solidified state, in which case, the thickness of the resultant covering layer of alloy becomes uneven. While in the field of pressure vessel to be used in high temperature and high pressure, which is the object of the present invention, even wall thickness of substrate made of heat resisting and pressure resisting material is strictly required, therefore uneven thickness of the covering layer renders the whole products disqualified.

It is desirable to add flux agent to the cast tube member in order to prevent oxidation at the inner surface of the cast tube member during the time until scattering the self-fluxing alloy, and to promote liquidity of the powder of self-fluxing alloy by reacting with the alloy.

The application of the flux agent to the cast tube member strengthens fusion of the covering layer of self-fluxing alloy to the tube member.

The flux agent contains following proportions in terms of % by weight:

CaO: 30–50%
SiO$_2$: 15–25%
B$_2$O$_3$: balance

One of method to add flux agent to the cast tube member is that the flux agent is scattered on the surface of molten metal in the ladle, causing flux agent to liquify, and is cast to the mold together with the molten heat resisting alloy.

Another method to add the flux agent to the cast tube member is that the flux agent is applied in the inner surface of the cast tube member immediately after casting by inserting long open vessel filled with flux agent into the rotating mold and scattering the flux agent by upsetting the vessel in the mold, or by throwing packs filled with flux agent into the cast tube member.

In both methods quantity of the flux agent to be added to the cast tube member is about 0.1–1 gram/cm$^2$ to the unit area of the surface.

The aforementioned methods afford desired covered reactor tube comprising tube member made of Fe-Cr-Ni austenitic heat resisting steel manufactured by centrifugal casting, having covering layer of self-fluxing alloy over the entire inner surface of the tube member.

The Ni-containing heat resisting steel forming the tube member of the reactor tube of this invention is Fe-Cr-Ni austenitic heat resisting steel. More specifically an example of such useful steel comprises 20 to 30% (by weight, the same as hereinafter) Cr, 18 to 40% Ni, 0.1 to 0.6% C, up to 2.5% Si, up to 2.0% Mn, up to 0.15% N and the balance substantially Fe. Also, useable is an alloy of the above composition wherein Fe is partly replaced by at least one of Mo, W and Nb in a combined amount of up to 5%.

An example of such self-fluxing alloy powder to be used for making covering layer comprises 13 to 40% Cr, 0 to 5% Ni, 0.01 to 4% C, up to 5% Si, up to 2.0% Mn, up to 0.15% N, up to 5% B and the balance substantially Fe.

However, the proportions of the components may be outside the above ranges or some components may be added to or removed from these materials insofar as the technical object of the invention can be fulfilled.

A self-fluxing alloy powder is ordinally used for metal spraying; however, the self-fluxing alloy powder mentioned here is different from one ordinarily used for metal spraying in that it is the type which is fused after metal spraying without any external heat source.

Another modification of the method to manufacture the reactor tube is to apply self-fulxing alloy by metal spraying process to the inner surface of the cast tube member which is manufactured by centrifugal casting, by inserting long gun from one of the opening of mold for centrifugal casting through band while rotating the mold.

It is desirable to add flux agent to the cast tube member simultaneously at the casting or immediately after the casting in order to promote liquidity of the self-fluxing alloy and to prevent oxidization of inner surface of the cast tube member during the term till performance of metal spraying.

It is also preferable to mix the flux agent with the self-fluxing alloy powder and add the mixture of the self-fluxing alloy powder with the flux agent to the inner surface of the cast tube by metal spraying. Spraying the self-fluxing alloy is preferably performed after solidification of the inner surface of the cast tube member in order to make the thickness of covering layer equal.

However, in the case the metal spraying is performed after solidification of the inner surface of the cast tube member, it is necessary to perform the process of metal spraying immediately after the solidification and finish the process in short period because although the radiation of heat from the inner surface of the tube member just after casting is strong, the radiation decreases gradually in accordance with cooling of the cast tube member. Therefore, in the process of spraying self-fluxing alloy powder it is necessary to improve work efficiency by increasing quantity of powder to be supplied per unit time.

For this purpose, it is advisable to use metal spraying apparatus having large capacity of supplying powder. More particularly the spraying apparatus is preferable to have the capacity of spraying powder of 100 to 500 grams per minute.

Since the tip area of gun of metal spraying apparatus is inserted into the cast tube member and is exposed to the high temperature radiated from the inner surface of the tube member, it is necessary to make the gun of the water-cooled type to prevent it from being over-heated. Metal spraying gun to be used in this method shall be long enough to be inserted to the full length of the cast tube member. When the self-fluxing alloy is sprayed from the gun, the temperature of the inner surface of the tube member may be 1320° to 1400° C. and the tube member may be rotating with the speed of 1000 to 1500 rpm.

The component and proportion of self-fluxing alloy powder and flux agent, and other details, for example, a centrifugal casting, method of adding flux agent to the cast tube member are the same with that of the first modification of the manufacturing method.

The method of the first modification is practical when the melting point of the self-fluxing alloy is lower than the melting point of the heat resisting alloy of tube member at least by 300° C. In this case, the self-fluxing alloy is possible to fuse to the inner surface of the cast tube member, without requiring any heat source, only by scattering the self-fluxing alloy to the inner surface of the cast tube member immediately after casting it. However, in the case that melting point of the self-fusing alloy powder is not lower than the melting point of heat resisting alloy of the tube member by 300° C., the method of the first modification is not practical use any more because self-fluxing alloy is unable to fuse to the inner surface of the tube member merely by scattering the self-fluxing alloy powder because of insufficiency of heat.

Whereas the method of the second modification has the advantage in such case as stated above, because in this method in addition to the heat radiated from the cast tube member, heat from metal spraying is also used as heat source for fusing the self-fluxing alloy powder firmly to the inner surface of the cast tube member.

Therefore, the method of the second modification has significant advantage to relieve restriction of condition for manufacturing reactor tube.

The products manufactured by the method of the second modification have higher quality in the fusing of the covering layer in comparison with the first modification because of increased heat source of metal spraying.

The reactor tube of the present invention can be manufactured by further modified method.

The tube member is manufactured by centrifugal casting. When the inner surface of the tube member has solidified, self-fluxing alloy powder and thermit agent are scattered to the inner surface of the tube member to fuse the self-fluxing alloy powder by the heat generated from exothermic reaction of the thermit agent.

The thermit agent is supplied in powder form which is a mixture of hematite and aluminum or a mixture of magnetite and aluminum.

The thermit agent may be mixed to the self-fluxing alloy powder by the ratio 0.5 to 2 times to the self-fluxing alloy and is scattered to the tube member together with the self-fluxing alloy.

Another method of adding the thermit agent is that after scattering of the self-fluxing alloy to the inner surface of the cast tube member the thermit agent is scattered separately from the self-fluxing alloy to the layer of self-fluxing alloy by the similar way of scattering the self-fluxing alloy using long open vessel, filled with thermit agent, and upseting it in the mold, or by filling the thermit agent in packages and throwing the packages into the mold from one of or both openings of the mold.

As the quantity of the thermit agent is controlled carefully, moderate exothermic reaction occurs in several seconds after application of the thermit agent to the cast tube member.

The exothermic reaction of the thermit agent is excited by the heat radiated from the cast tube member, and elevates the temperature of the layer of self-fluxing alloy by 200° to 400° C. The heat generated by the exothermic reaction of the thermit agent makes the self-fluxing alloy fuse to the inner surface of the tube member to form the covering layer over it.

In the method of adding thermit agent, the covering layer contains not only the self-fluxing alloy but also metals produced by the chemical reaction of the thermit agent, for example, Fe and up to 5% by weight of Al produced by the thermit reaction.

It is desirable to add flux agent to the cast tube member from the same reason as explained in the method of the first modification. The flux agent shall be added to the tube member separately from scattering of the self-fluxing alloy powder and thermit agent, or shall be mixed with self-fluxing alloy powder, or with mixture of self-fluxing alloy powder and thermit agent, or with thermit agent.

The advantage of this method is that it is not required to scatter the self-fluxing alloy powder immediately after the casting of the tube member and is allowed to scatter the self-fluxing alloy when the cast tube member is cooled to a relatively low temperature because in this method the heat generated by the exothermic reaction of the thermit is used as a heat source for fusing the self-fluxing alloy in addition to the heat radiated from the cast tube member.

The method of the third modification makes it possible to fuse the alloy to the inner surface of the tube member even in the case where the melting point of the self-fluxing alloy is not 300° C. below the melting point of the heat resisting alloy of the tube member, however the method of the first modification cannot be used in such a case as stated above because of insufficency of heat to fuse the alloy to the inner surface of the tube member.

By means of the method of any of the first to third modifications, a desired reactor tube shall be manufactured, the reactor tube comprising tube member made of Fe-Cr-Ni austenitic heat resisting steel and covering layer of self-fluxing alloy fused to the inner surface of the tube member.

Because the covering layer of self-fluxing alloy free from or almost free from Ni provides the inner surface of the reactor tube to be exposed to the flow of a hydrocarbon-containing fluid, the invention greatly reduces the likelihood that Ni will act adversely as a catalyst, with the result that the deposition of solid carbon can be inhibited effectively.

With conventional reactor tubes, the carbon separating out from the fluid invades the wall of the reactor and forms carbides in the microstructure of the heat resisting steel which forms the reactor wall, thus causing so-called cementation to inevitably embrittle or damage the reactor seriously, whereas when the covering layer is provided to the inner surface of tube member, the presence of the alloy of the covering layer inhibits separation of carbon per se, whereby cementation can be prevented effectively.

Since the reactor tube is used at high temperatures and high pressures, the Fe-Cr-Ni austenitic heat resisting steel material forming the tube member must of course have sufficient heat resistance and high-temperature strength to withstand the operating temperature and pressure. Whereas the layer of the self-fluxing alloy forming the covering layer may have a desired wall thickness.

For operating the reactor tube it is ordinily required to elevate the temperature of the tube wall in proportion to the increase of the thickness of the tube wall.

But in the reactor tube of the present invention, the same operating conditions as practiced conventionally is applied in spite of the existence of the covering layer because after fusing the layer of the self-fluxing alloy on the inner surface of the tube member, the covering layer can be internally cut by a machine to suitably reduce the wall thickness (for example, to 0.5 mm or smaller).

The present tube can be used under the same operating conditions as practiced conventionally because the amount of solid carbon deposit decreases to consequently inhibit the rise of the tube wall temperature during operation, such that the tube can be designed for a lower temperature under the same operating conditions as heretofore employed. It is therefore possible to construct the reactor tube with a smaller overall wall thickness than conventional tubes and to operate the tube for a period of time per annum not shorter than is the conventional case.

The tube of this invention is advantageously usable for thermally cracking hydrocarbons singly or as admixed with steam, oxygen-containing gas or the like to obtain lower-molecular-weight hydrocarbons or to produce a gaseous fluid containing hydrogen, carbon oxide, etc., under the conditions of at least 500° C. in temperature and pressure of not lower than the atmosphere which involve the necessity of using Ni-contaioning heat resisting steel.

The present invention is not limited to the foregoing embodiments and the drawings but can be embodied into various modifications. It is to be understood that such modifications are included within the scope defined in the appended claims.

What is claimed is:

1. A method of manufacturing reactor tube for thermally cracking or reforming a hydrocarbon characterized by;
   casting tube member from molten Fe-Cr-Ni heat resisting steel by means of centrifugal casting, and scattering self-fluxing alloy powder free from or with a low Ni content on the inner surface of tube body during such stage when the inner surface of the tube member has solidified but high temperature in the tube member is retained, the self-fluxing alloy being molten by the heat of the cast tube member and layer of self-fluxing alloy being formed over and fused to the inner surface of the tube member.

2. A method as defined in claim 1 wherein flux agent is applied to the surface of molten metal simultaneously at the casting of tube member.

3. A method as defined in claim 2 wherein the flux agent comprises following components in the following proportions in terms of % by weight;
   CaO: 30–50%
   $SiO_2$: 15–25%
   $B_2O_3$: balance.

4. A method as defined in claim 1, wherein flux agent is applied to the inner surface of the cast member immediately after casting thereof.

5. A method of manufacturing reactor tube for thermally cracking or reforming a hydrocarbon characterized by;
   casting tube member from molten Fe-Cr-Ni heat resisting steel by means of centrifugal casting, and spraying powder of self-fluxing alloy over inner surface of cast tube member after solidification of the inner surface of the tube member, the sprayed self-fluxing alloy being fused and layer of self-fluxing alloy being formed over the inner surface of the tube member.

6. A method as defined in claim 5 wherein flux agent is applied to the surface of molten metal simultaneously at the casting of tube member.

7. A method as defined in claim 5 wherein the flux agent is mixed to the self-fluxing alloy powder, and the mixture containing the flux agent is simultaneously sprayed to the inner surface of the tube member.

8. A method as defined in claim 6 or 7 wherein the flux agent comprises following components in the following proportions in terms of % by weight;
   CaO: 30–50%
   $SiO_2$: 15–25%
   $B_2O_3$: balance.

9. A method as defined in claim 5, wherein flux agent is applied to the inner surface of the cast member immediately after casting thereof.

10. A method of manufacturing reactor tube for thermally cracking or reforming a hydrocarbon characterized by;
    casting tube member from molten Fe-Cr-Ni heat resisting steel by means of centrifugal casting method, and scattering self-fluxing alloy powder and thermit agent to the inner surface of tube member after solidification of the inner surface of the tube member, the self-fluxing alloy powder caused to melt by the heat of exothermic reaction of thermit agent and covering layer of self-fluxing alloy being formed over and fused to the inner surface of tube member.

11. A method as defined in claim 10 wherein after solidification of the tube member, thermit agent is added to the inner surface of the tube member successively after scattering powder of self-fluxing alloy.

12. A method as defined in claim 10 wherein thermit agent is mixed with powder of self-fluxing alloy and scattered over inner surface of tube member together with the self-fluxing alloy.

13. A method as defined in any one of claims 10 to 12 wherein a flux agent is applied to the surface of molten metal simultaneously at the casting of tube member.

14. A method as defined in claim 13 wherein the flux agent is mixed with a member selected from the group consisting of self-fluxing alloy powder, powder of mixture of self-fluxing alloy powder and thermit agent, and thermit agent.

15. A method as defined in claim 14 wherein the flux agent comprises following components in the following proportions in terms of % by weight;
    CaO: 30–50%
    $SiO_2$: 15–25%
    $B_2O_3$: balance.

16. A method as defined in any one of claims 10–12, wherein the flux agent is applied to the inner surface of the cast member immediately after casting thereof.

17. A method as defined in any one of claims 1, 5, and 10, wherein the self-fluxing alloy powder comprises the following components in terms of % by weight:
    13–40% Cr
    0–5% Ni
    0.01–4% C
    up to 5% Si
    up to 2.0% Mn
    up to 0.15% N
    up to 5% B
    balance substantially Fe.

* * * * *